(12) United States Patent
Parker

(10) Patent No.: US 7,951,409 B2
(45) Date of Patent: May 31, 2011

(54) METHOD AND APPARATUS FOR MARKING AN EGG WITH AN ADVERTISEMENT, A FRESHNESS DATE AND A TRACEABILITY CODE

(75) Inventor: Bradley E. Parker, Glen Ridge, NJ (US)

(73) Assignee: NewMarket Impressions, LLC, Beverly Hills, CA (US)

( * ) Notice: Subject to any disclaimer, the term of this patent is extended or adjusted under 35 U.S.C. 154(b) by 522 days.

(21) Appl. No.: 11/333,580

(22) Filed: Jan. 17, 2006

(65) Prior Publication Data

US 2006/0138105 A1 Jun. 29, 2006

Related U.S. Application Data

(63) Continuation-in-part of application No. 10/542,324, filed on Apr. 4, 2007, now abandoned.

(51) Int. Cl.
*A23L 1/32* (2006.01)
(52) U.S. Cl. ........ 426/231; 426/241; 426/248; 426/298; 426/614; 426/383; 426/516; 99/451; 235/375
(58) Field of Classification Search .................... 426/87, 426/231, 237, 241, 242, 248, 298, 614, 383, 426/506; 235/375; 99/451
See application file for complete search history.

(56) References Cited

U.S. PATENT DOCUMENTS

| | | |
|---|---|---|
| 1,906,094 A | 4/1933 | Powell |
| 3,094,920 A | 6/1963 | Priesmeyer |
| 3,665,148 A | 5/1972 | Yasenchak et al. |
| 3,779,159 A | 12/1973 | Rose et al. |
| 3,916,143 A | 10/1975 | Farrell |
| 4,043,105 A | 8/1977 | Cochran |
| 4,578,329 A | 3/1986 | Holsappel |
| 4,636,043 A | 1/1987 | Bellar |
| 4,652,722 A | 3/1987 | Stone et al. |
| 4,659,902 A | 4/1987 | Swensrud et al. |
| 4,839,181 A | 6/1989 | MacMurray et al. |
| 4,843,958 A | 7/1989 | Egosi |

(Continued)

FOREIGN PATENT DOCUMENTS

DE  3601913  7/1987

(Continued)

OTHER PUBLICATIONS

Translation of Gartzen et al (DE4322252).*

(Continued)

*Primary Examiner* — Drew E Becker
(74) *Attorney, Agent, or Firm* — Wolf, Greenfield & Sacks, P.C.

(57) ABSTRACT

A method of marking an egg is disclosed and comprises applying radiant energy to the shell of an egg so as to cause discoloration of the eggshell, thereby forming a marking comprising at least a traceability code and a freshness date. Apparatus is also disclosed for applying markings on eggs being processed by an egg-handling machine that is designed and configured to transport a plurality of eggs therethrough, wherein the apparatus comprises a radiant energy source located in proximity to the egg-handling machine, the radiant energy source being configured to apply radiant energy to the eggs as the eggs are transported past the radiant energy source to selectively discolor the shell of the eggs and form markings on the shell, including a freshness date and a traceability code.

20 Claims, 11 Drawing Sheets

| Your Egg Information | |
|---|---|
| Egg Trace Ability Code | 1035B054A01 |
| Producer | Parker Reichman |
| Site Code | P1036 |
| Producer Address | CR 171, Murphy, North Carolina |
| Process Date | July 23, 2005 |
| Process Time | 4:05 pm |
| Grader | A |
| Packer Lane | 3 |
| Customer | Wal-Mart |
| USDA Certified | Yes |
| Packaging | 18Pk Box 60/16s |
| Color | White |
| Washer Temp | 103° F |
| Cooler Temp | 45° F |

U.S. PATENT DOCUMENTS

| | | | |
|---|---|---|---|
| 4,900,617 A | 2/1990 | Smith | |
| 5,021,631 A | 6/1991 | Ravellat | |
| 5,120,631 A | 6/1992 | Kanbayashi et al. | |
| 5,120,928 A | 6/1992 | Piliero | |
| 5,142,976 A | 9/1992 | Roulleau | |
| 5,164,009 A * | 11/1992 | Chandler | 118/13 |
| 5,198,843 A | 3/1993 | Ito et al. | |
| 5,262,470 A | 11/1993 | Shimotsuma et al. | |
| 5,316,397 A | 5/1994 | Robertson et al. | |
| 5,335,003 A | 8/1994 | Sugden | |
| 5,477,179 A | 12/1995 | Takada et al. | |
| 5,478,990 A * | 12/1995 | Montanari et al. | 235/375 |
| 5,526,119 A | 6/1996 | Blit et al. | |
| 5,608,429 A | 3/1997 | Hayashihara et al. | |
| 5,646,765 A | 7/1997 | Laakmann et al. | |
| 5,653,900 A | 8/1997 | Clement | |
| 5,660,747 A * | 8/1997 | Drouillard et al. | 219/121.69 |
| 5,691,757 A | 11/1997 | Hayashihara et al. | |
| 5,734,412 A | 3/1998 | Hasebe et al. | |
| 5,767,477 A | 6/1998 | Sutter, Jr. | |
| 5,792,807 A | 8/1998 | Hayashihara et al. | |
| 5,798,843 A | 8/1998 | Yamamoto et al. | |
| 5,817,243 A | 10/1998 | Shaffer | |
| 5,897,797 A | 4/1999 | Drouillard | |
| 5,928,842 A | 7/1999 | Shinmoto et al. | |
| 6,018,135 A | 1/2000 | Weick | |
| 6,029,424 A * | 2/2000 | McEvoy et al. | 53/443 |
| 6,154,738 A * | 11/2000 | Call | 707/4 |
| 6,180,914 B1 | 1/2001 | Jones et al. | |
| 6,188,990 B1 * | 2/2001 | Brook et al. | 705/28 |
| 6,270,222 B1 | 8/2001 | Herpst | |
| 6,421,159 B1 | 7/2002 | Sutter et al. | |
| 6,429,889 B1 | 8/2002 | Murokh | |
| 6,546,304 B2 * | 4/2003 | Thorvaldsson et al. | 700/115 |
| 6,584,982 B1 * | 7/2003 | Clay et al. | 131/368 |
| 6,678,094 B2 | 1/2004 | Sator et al. | |
| 6,732,928 B1 * | 5/2004 | Lawlor | 235/462.01 |
| 6,791,592 B2 * | 9/2004 | Assa et al. | 347/225 |
| 6,796,241 B2 | 9/2004 | Catalan et al. | |
| 6,810,796 B2 | 11/2004 | Catalan et al. | |
| 6,829,000 B2 * | 12/2004 | Assa et al. | 347/257 |
| 7,096,221 B2 * | 8/2006 | Nakano | 340/825.36 |
| 7,575,770 B2 * | 8/2009 | Garwood | 426/232 |
| 2001/0030179 A1 | 10/2001 | Knieb et al. | |
| 2002/0011311 A1 | 1/2002 | Carignan et al. | |
| 2002/0179580 A1 | 12/2002 | Costin | |
| 2003/0015507 A1 | 1/2003 | Miller et al. | |
| 2003/0080191 A1 * | 5/2003 | Lubow et al. | 235/462.01 |
| 2003/0206227 A1 * | 11/2003 | Assa et al. | 347/252 |
| 2003/0226835 A1 | 12/2003 | Bell | |
| 2004/0130612 A1 * | 7/2004 | Assa et al. | 347/234 |
| 2006/0012821 A1 * | 1/2006 | Franklin et al. | 358/1.15 |
| 2006/0138105 A1 | 6/2006 | Parker | |
| 2007/0086822 A1 | 4/2007 | Sato | |

FOREIGN PATENT DOCUMENTS

| | | |
|---|---|---|
| DE | 3722176 | 1/1989 |
| DE | 3836821 | 5/1990 |
| DE | 247831 | 4/1991 |
| DE | 0291471 A5 | 4/1991 |
| DE | 4125007 | 1/1993 |
| DE | 4322252 | 1/1995 |
| DE | 10109109 | 10/2001 |
| EP | 0421837 | 4/1991 |
| EP | 0684144 | 11/1995 |
| ES | 2033185 | 3/1993 |
| FR | 2654662 | 5/1991 |
| FR | 2621529 | 4/1999 |
| GB | 2131767 A | 6/1984 |
| JP | 55034966 | 3/1981 |
| JP | 58-090985 | 5/1983 |
| JP | 61206692 | 9/1986 |
| JP | 1108940 | 4/1989 |
| JP | 1196259 | 8/1989 |
| JP | 2-60552 | 3/1990 |
| JP | 3-138092 A | 6/1991 |
| JP | 3-221290 A | 9/1991 |
| JP | 3211068 | 9/1991 |
| JP | 5-146887 | 6/1993 |
| JP | 7011183 | 1/1995 |
| JP | 11-28588 A | 2/1999 |
| JP | 2000-168157 | 6/2000 |
| JP | 2000168157 | 6/2000 |
| JP | 2001-136859 | 5/2001 |
| JP | 2001136859 | 5/2001 |
| JP | 2005-138169 A | 6/2005 |
| WO | WO 01/56789 | 8/2001 |

OTHER PUBLICATIONS

Translation of Mitsuo Yamada et al (JP-2000-168157).*
Translation of Akio Iwasa (JP 5-2001).*
Translation of Tanio Shisei et al (JP-61-206692).*
Yakov Horenstein, "How Lasers Could Print Ads on Food", Daily Mail, Mar. 4, 1999.
Greg Stiles, "Laser Labeling", Mail Tribune, Sep. 19, 2004.
Durand-Wayland Labeling Systems, http://www.durand-wayland.com/label/8/7/2006, downloaded Aug. 7, 2006.
European Search Report from related application, PCT/US 08/03160, filed Mar. 11, 2008, mailed Aug. 12, 2008.
Singapore Written Opinion for Singapore Patent Application No. 200906160-7, dated Oct. 28, 2010.
Machine translation of Japan Patent document JP-2000-263,276, May 2010.
Machine translation of Japan Patent document JP2003-290,939, May 2010.
Machine translation of Japan Patent document JP-2000-168,157, May 2010.

* cited by examiner

| Your Egg Information | |
|---|---|
| Egg Trace Ability Code | 1035B054A01 |
| Producer | Parker Reichman |
| Site Code | P1036 |
| Producer Address | CR 171, Murphy, North Carolina |
| Process Date | July 23, 2005 |
| Process Time | 4:05 pm |
| Grader | A |
| Packer Lane | 3 |
| Customer | Wal-Mart |
| USDA Certified | Yes |
| Packaging | 18Pk Box 60/16s |
| Color | White |
| Washer Temp | 103° F |
| Cooler Temp | 45° F |

| Key Egg Dates | |
|---|---|
| Packed Date | July 23, 2005 |
| Sell By Date | August 10, 2005 |
| Use By Date | August 10, 2005 |
| Expiration Date | August 20, 2005 |

US 7,951,409 B2

METHOD AND APPARATUS FOR MARKING AN EGG WITH AN ADVERTISEMENT, A FRESHNESS DATE AND A TRACEABILITY CODE

This is a continuation-in-part of patent application entitled METHOD AND APPARATUS FOR MARKING AN EGG WITH AN ADVERTISEMENT AND A FRESHNESS DATE, filed Apr. 4, 2005, and given Ser. No. 10/542,324 now abandoned.

BACKGROUND OF THE INVENTION

The present invention relates to an egg marked with advertisements, a freshness date and a traceability code, and the method and apparatus used to create those eggs. Advertising on eggs provides a unique medium for advertisers to reach consumers. Attempts have been made to take advantage of this medium of advertising as described in U.S. Pat. No. 4,843,958, to Egosi and titled "Method and Apparatus for Applying Advertisements to Eggs." However, there is still a need for an easy application of advertising on eggs. There is also a need to put a date on eggs, to ensure customers that the egg is fresh.

The present invention addresses this need. The present invention provides an egg that has a freshness date, a traceability code and one or more advertising messages applied on it. The traceability code enables the consumer to access one or more websites and input the code and obtain information relating to the history of the egg. The freshness date tends to cause the consumer to scrutinize the egg, to confirm that it is fresh. As the consumer looks at the egg, he or she will tend to view the advertisement as well. Thus, providing both the freshness date and the advertisement enhances the efficacy of the advertisement. Moreover, the cost of the marking operation is at least partially offset by the economic value of the advertisement. Further aspects of this invention provide methods and apparatus for applying markings to eggs.

SUMMARY OF THE INVENTION

One aspect of embodiments of the present invention includes a method of marking an egg by applying radiant energy to the shell of an egg so as to cause discoloration of the eggshell to form a permanent marking. The markings include text and graphics, and can include an advertisement, a freshness date, and a traceability code or most preferably includes all of this information. A laser is preferably employed as the radiant energy source. Desirably, the radiant energy is applied so as to leave much of the area of the eggshell unaffected so as to form contrast between the unaffected areas and the marking. The method preferably forms the markings while the egg rapidly moves through a predetermined region of an egg handling machine.

In the preferred method according to the present invention, the markings are made by laser etching without applying a foreign material to the eggshell.

A preferred embodiment comprises an apparatus for applying markings on eggs that is operable in association with an egg-handling machine that performs washing, candling, grading and packing of eggs. The apparatus comprises a radiant energy source located in proximity to the egg-handling machine, so that the radiant energy source can apply radiant energy to the egg to discolor the eggshell and form the markings. There is provided an egg bearing an information marking on it, wherein the marking is formed at least in part by discolored material on the eggshell. The egg may include the marking being formed entirely by discolored material of the eggshell. The egg may also be raw or pasteurized.

In some embodiments, a method of marking an egg is provided, comprising applying radiant energy to the shell of an egg so as to cause discoloration of the eggshell, thereby forming a marking comprising at least a traceability code and a freshness date. The marking may further comprise an advertisement. The radiant energy may be applied by a laser. The markings may be formed by a generally stationary radiant energy source as the egg is transported by said source.

In some further embodiments, an apparatus is provided for applying markings on eggs being processed by an egg-handling machine that is designed and configured to transport a plurality of eggs therethrough, said apparatus comprising a radiant energy source located in proximity to the egg-handling machine, said radiant energy source being configured to apply radiant energy to the eggs as the eggs are transported past said radiant energy source to selectively discolor the shell of the eggs and form markings on the shell, including a freshness date and a traceability code. The egg-handling machine may be an egg-grading machine.

In some further embodiments, a method of marking at least one egg is provided, comprising: conveying the egg to a marking station having at least one laser marking device configured to apply laser energy of sufficient intensity to etch indicia in the outer surface of the shell of the egg; and activating the laser device to apply laser energy to the egg and thereby etch the indicia in the outer surface of the egg shell, said indicia comprising at least a freshness date and a traceability identification. The indicia may further comprise advertising text and/or graphics. The applied laser energy may ablate and melt surface egg shell material to an approximate depth within the range of about 25 to about 200 micrometers, where the depth may be within the range of about 50 to about 90 micrometers. The applied laser energy may ablate and melt surface egg shell material to an approximate depth that is within the range of about 5 to about 8 percent of the thickness of the egg shell. The traceability identification may comprise one or more items of information selected from the group consisting of: a traceability code; an identification of the producer of the egg; an address of the producer; a process date of the egg; a time of processing the egg; an identification of the grader of the egg; an identification of the packer lane in which the egg was processed; an identification of the customer who purchased the egg; an indication of the type of packaging of the egg; an indication of the color of the egg; an indication of the temperature at which the egg was washed; an indication of the temperature of the cooler in which the egg was placed; and an identification of any advertising indicia that was placed on the egg.

In some further embodiments, an egg is provided having indicia on an outer portion of its shell, said indicia comprising a freshness date and a traceability code that specifies unique identification and history information regarding the egg. The indicia may be laser etched on the outer portion of its shell. The unique identification and history information may comprise one or more items of information selected from the group consisting of: a traceability code; an identification of the producer of the egg; an address of the producer; a process date of the egg; a time of processing the egg; an identification of the grader of the egg; an identification of the packer lane in which the egg was processed; an identification of the customer who purchased the egg; an indication of the type of packaging of the egg; an indication of the color of the egg; an indication of the temperature at which the egg was washed; an indication of the temperature of the cooler in which the egg was placed; and an identification of any advertising indicia that was placed on the egg. The traceability code may be capable of being inserted into a field of at least one predetermined Internet website, which website is configured to display said identification and history information of the egg.

In some further embodiments, an egg is provided having the outer surface of its shell laser etched with a freshness date and a traceability code that specifies unique identification and history information regarding the egg.

In some further embodiments, a system is provided for processing eggs and providing information relating to eggs that are processed through the system, the system comprising egg grading, candling, marking and packing stations, said system including a central processing unit having associated memory that is configured to receive and store data relating to eggs that are processed through the system, said system comprising: conveying the eggs through said egg grading station where said eggs are graded and data relating to the grade of each egg is transmitted to said central processing unit; conveying the eggs through said egg candling station where said eggs are candled and data relating to the candling of each egg is transmitted to said central processing unit; conveying the eggs through said egg marking station where said eggs are marked with at least a freshness date and a traceability code that specifies unique identification and history information regarding the egg; storing data relating to the marking of each egg in memory associated with said central processing unit; and conveying the eggs through said egg packing station where data relating to the packaging of each egg is transmitted to said central processing unit, said central processing unit being operatively connected to a predetermined website that is accessible through the Internet, wherein said identification and history information regarding an individual egg is accessible by inserting its traceability code in a predetermined field of said website. The markings may further comprise advertising indicia. The marking station may further comprise at least one laser.

For a better understanding of the present invention, reference is made to the following description, taken in conjunction with the accompanying drawings.

DETAILED DESCRIPTION

Figure 1:
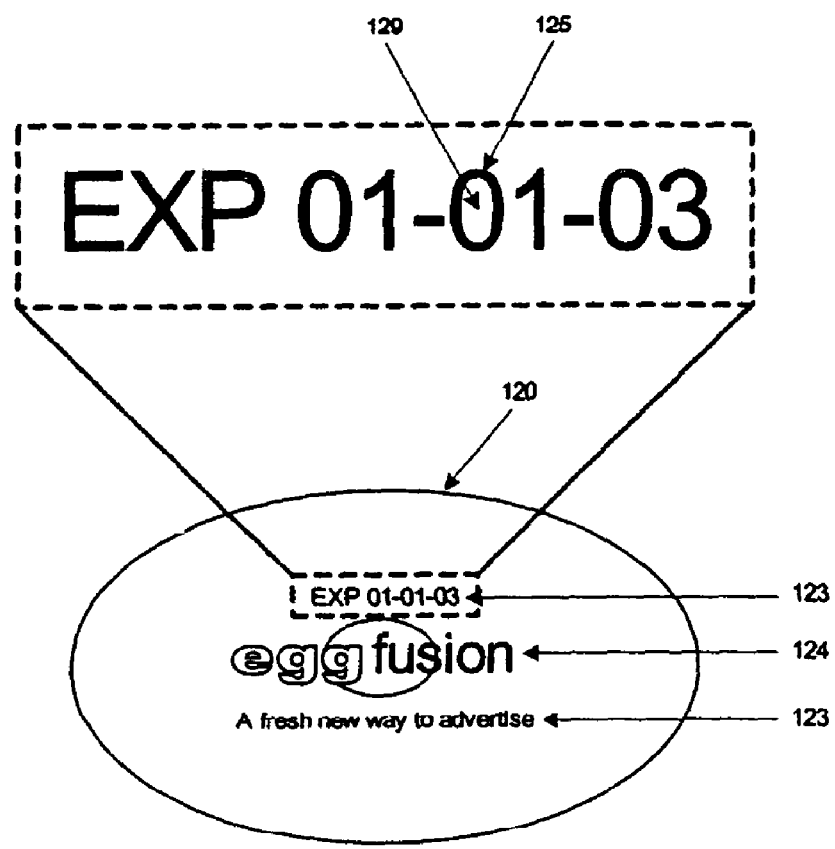
FIG. 1 is a diagram depicting an egg bearing markings using method and apparatus embodiments of the present invention.

Referring to FIG. 1, an egg 120 is provided with markings (i.e., indicia). The markings include text 123 and graphics 124. The markings are formed by discoloring material of the shell to form text 123 and graphics 124, by discoloring some material of the shell, such as that which forms the number 0 as indicated at 125 and leaving other areas of the shell unaffected, such as the area inside the number 0, as indicated at 129. The discoloration may also be done variably so as to form a gradient of discoloration to form the graphics 124, or to create a variety of text 123 such as bold text, italic text, or any type of text font. That is, some areas may be more discolored than others as, for example, by exposing them to radiant energy for a higher intensity or longer duration than other areas. The egg itself preferably is a raw chicken egg, although other edible raw eggs such as, duck, goose or ostrich eggs can be used. Also, the markings on can be applied to precooked eggs, as for example, boiled or microwaved eggs.

Figure 2:
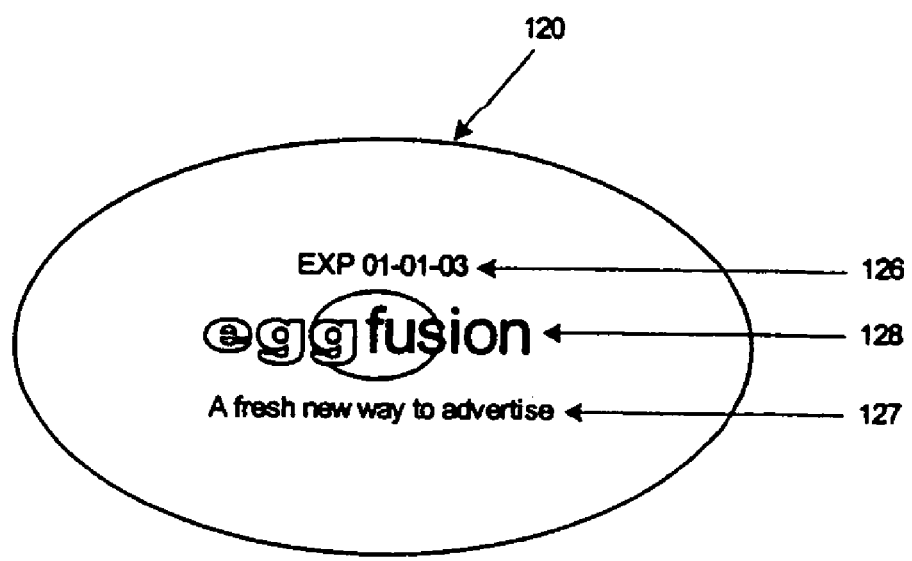
FIG. 2 is a diagram of another view of an egg bearing markings using method and apparatus embodiments of the present invention.
Figure 3:
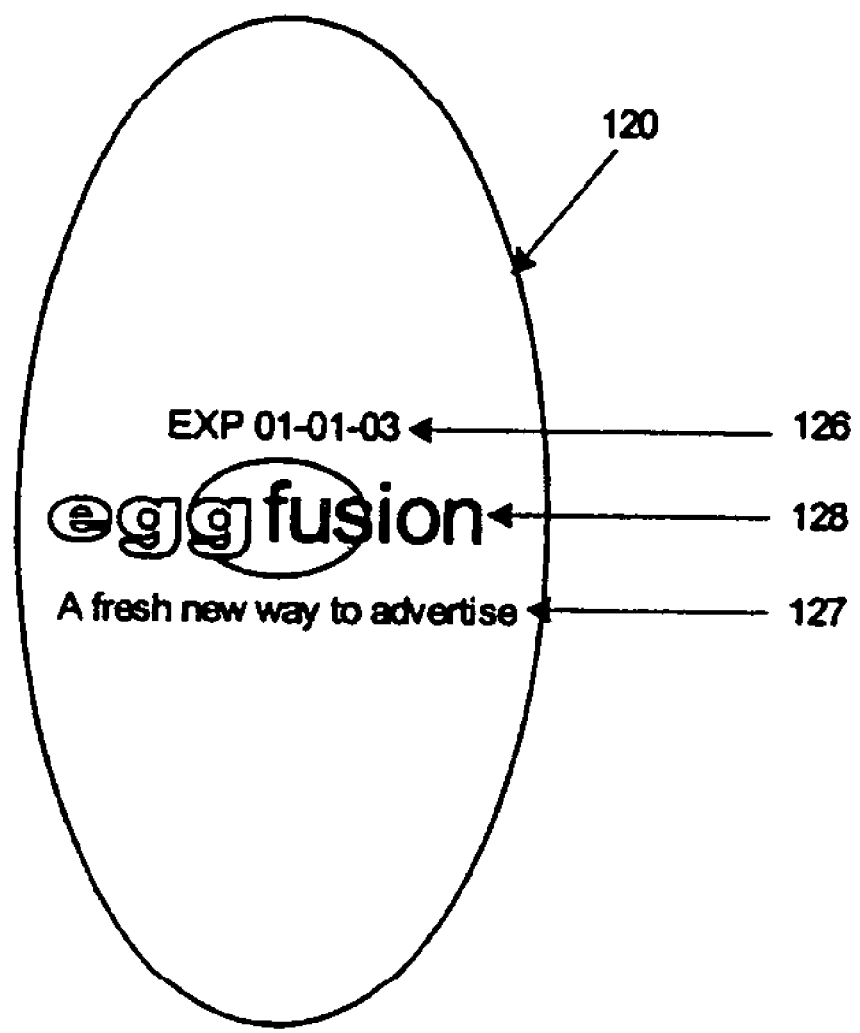
FIG. 3 is a diagram of another view of an egg bearing markings using method and apparatus embodiments of the present invention.
Figure 4:
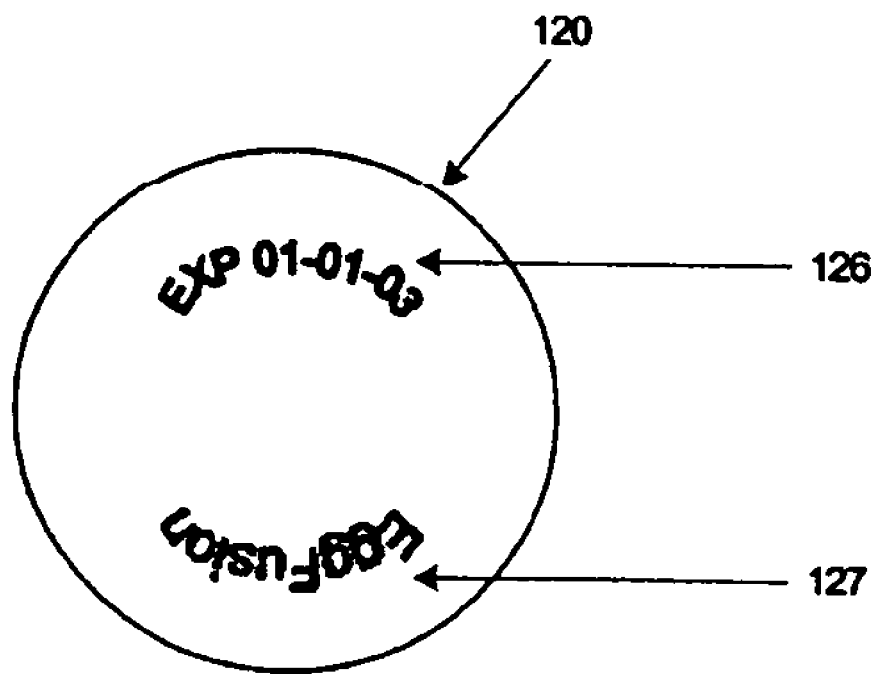
FIG. 4 is a diagram of a top view of an egg bearing markings using method and apparatus embodiments of the present invention.

The text and graphics may be applied horizontally (FIG. 2), vertically (FIG. 3), or on top (FIG. 4) of the egg 120. The text and graphic discolorations can be controlled to form a freshness date 126 and an advertisement 127, 128. The freshness date 126 may also include a traceability code 135 (see FIG. 10) to identify the origin of the egg. The advertisement includes a tag line or other information 127 and/or a logo 128. Most preferably, the egg 120 includes a freshness date 126, a tag line 127, a logo 128 and a traceability code 135. The advertisement, comprised of at least the tag line 127 and logo 128, may include a trademark, slogan, or any other promotional text or graphics affiliated with conveying information for advertising.

Figures 12, 13:
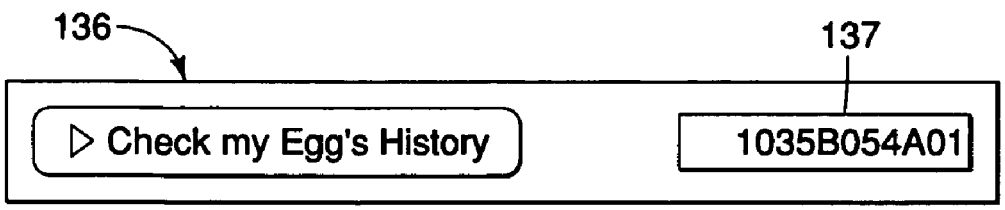
FIG. 12 is another table indicating history and aging information that may be supplied on at least one website when a traceability code of an egg is entered in a predetermined window located on a website.
FIG. 13 is a diagram depicting a display that included the predetermined window for entering a traceability code of an egg, wherein the display may be provided at one or more websites

The freshness date 126 is provided to reassure consumers about the expiration date of the particular egg 120. The traceability code 135 enables a consumer, for example, to obtain detailed historical information regarding the location of where the egg was produced in order to assist in consumer alerts. This detailed historical information accessible to the consumer by virtue of the historical information being located in a database that is generated during the processing of eggs during the egg-handling and marking of the egg. The eggs that are sold with the above described markings will initially be sold by safety conscious grocery stores and chains that recognize the need to provide their customers with information about the freshness of the eggs they sell. Since most large grocery stores and chains have websites they maintain for their and their customer's benefit, they will have a display, such as display 136 shown in FIG. 13, located prominently on their website that has a window 137 in which a consumer can enter the alpha-numeric identification of the egg they wish to inquire about. When they do so, detailed historical data such as that shown in FIG. 11 will be shown which provides a wealth of information about the history of the egg. For example, it can include all of the items shown in the table of FIG. 11, as well as other information that can include an indication of whether the eggs are laid by chickens that are caged, free range, or caged in a certain sized cage, the diet, supplements and medication the chickens are given, among other items.

With regard to the expiration date, there is not consistency with regard to what such a date indicates. The information that can be provided by the table of FIG. 12 cuts through the ambiguity of terms that are commonly used at the present time by providing information relating to each of them. Importantly, the date that they were processed and packed is indicated and this is nearly always the date that they were laid by chickens. "Sell by" and "use by" dates are indicated and an expiration date is also indicated. While the FDA or other governmental agency may dictate expiration dates in the future, it is presently believed that it is safe to consume refrigerated eggs within 30 days of their packing date.

Figures 10, 11:
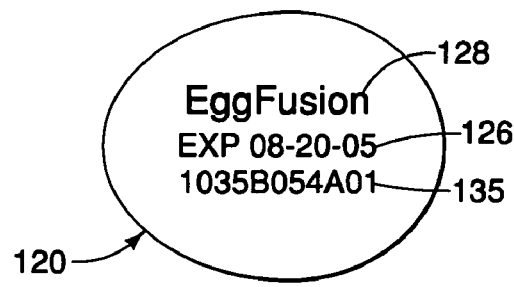
FIG. 10 is another diagram depicting an egg bearing markings using method and apparatus embodiments of the present invention.
FIG. 11 is a table indicating history information that may be supplied on at least one website when a traceability code of an egg is inserted in a predetermined window located on a website.

While each egg is preferably provided with a unique traceability code, it should be understood that having several eggs with the exact same traceability code is within the spirit and scope of the present invention. For example, if all eggs run through a particular line, within a few minutes of one another, and all or nearly all of the items of information shown in the table of FIG. 11 are the same, the fact that they had the same traceability code should not avoid infringement. In other words, the word 'unique' in this context, means that the traceability code will enable a customer to obtain all relevant historical information relating to any egg by accessing the database through the website or otherwise. In this regard, a consumer not having a computer should be able to obtain such information from the seller of the egg by telephone or direct inquiry at the seller's store, for example.

Radiant energy as, for example, electromagnetic radiation such as visible, infrared or ultraviolet light, can be used to discolor the eggshell. The radiant energy can be controlled to only discolor a targeted print area 125 of the eggshell. Some areas of the egg can be left unaffected 129 (see FIG. 1). The discoloration on the eggshell is easily viewable because of the contrast of the eggshell color 129 to the discoloration 125 from the radiant energy. A significant benefit of the use of laser marking is that brown eggs have etched indicia that is a contrasting white color, while white eggs have etched indicia that is a contrasting dark brown color. The discoloration 125 can be used to form indicia or marking information on the eggs. The discoloration to form text and graphics can be applied generally simultaneously by one or more radiant energy source.

No foreign material must be added to the eggshell in order for the radiant energy to discolor the eggshell. Thus, no foreign material such as any ink or radiant energy sensitive material that could react with the radiant energy needs to be added to form a marking. The radiant energy is applied to the natural eggshell. Thus, the marking most desirably is formed solely by the effect of the radiant energy on the normally occurring materials of the eggshell itself. This provides several significant benefits. The egg can be properly represented to the consumer as a product with no additives or contaminants. Moreover, because it is not necessary to apply additional materials for purposes of the marking process, it is unnecessary to add the equipment needed contact the egg with a foreign substance. This greatly simplifies the task of performing the process inline in the production environment of an existing high-speed egg handling apparatus.

In a method according to an embodiment of the present invention, a radiant energy source 110 (FIG. 5) in proximity of an egg 120 directs radiant energy 112 towards the egg 120. Radiant energy source 110 desirably includes a laser such as a $CO_2$ gas laser adapted to provide light at about 10.6 nm wavelength, at a minimum of 25 watts, and a projected maximum of 200 watts radiated power, in a beam projected from approximately 100 mm at the surface of the egg. When operated in this power range, the beam ablates and melts the outer surface material from the egg shell. The structural integrity of the egg shell is not affected because the etching by the beam only affects the outer approximately 50 to approximately 90 micrometers of the egg shell, which is approximately 5% to approximately 8% of the thickness of the egg shell. The beam is directed onto those areas of the egg, which are to be discolored and turned on and off so as to provide a series of pulses, the beam being "on" for about 60 milliseconds during each pulse. During this pulsed actuation, the beam is swept across those areas of the egg surface, which are to be discolored The sweeping motion may be performed in any manner which will provide the desired relative motion of the beam and the egg. Since the preferred embodiments will operate in association with an egg-handling machine which moves eggs at an extremely rapid speed, the beam must be rapidly moved to produce the desired indicia and also compensate for the speed of movement of the eggs past the laser apparatus, which is preferably stationary. For example, the radiant energy source 110 may include a beam-sweeping unit incorporating conventional optical elements such as movable or variable lenses, mirrors or prisms adapted to deflect the beam and to vary the deflection with time. One suitable radiant energy source is a laser of the type sold under the designation DSL-1 Series (in all available wattages) by the Domino Amjet and Domino Printing Company of Gurnee, Ill., U.S.A.

Figure 5:
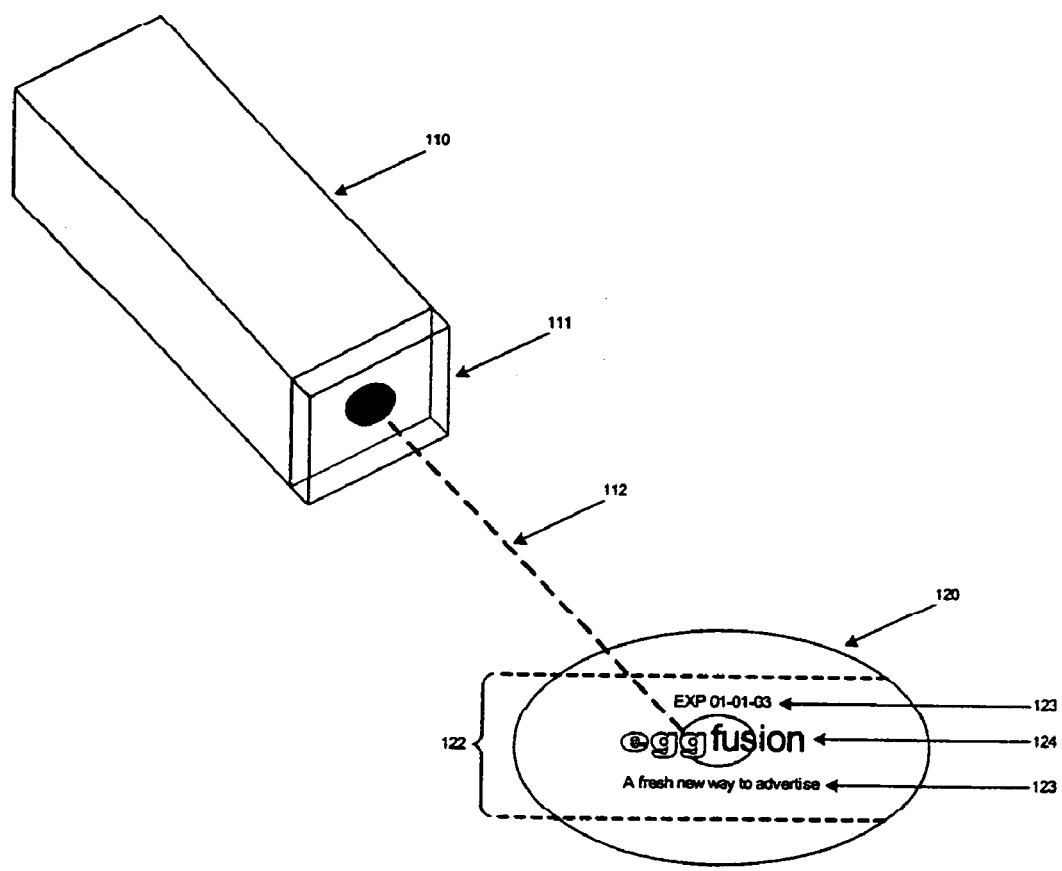
FIG. 5 is a diagrammatic view depicting apparatus for performing an embodiment of the method of the present invention.

Using such equipment, and referring to FIG. 5, radiant energy 112 is directed towards a target print area 122 of egg 120. Radiant energy 112 discolors egg 120 to form text 123 and graphics 124.

Figure 6:
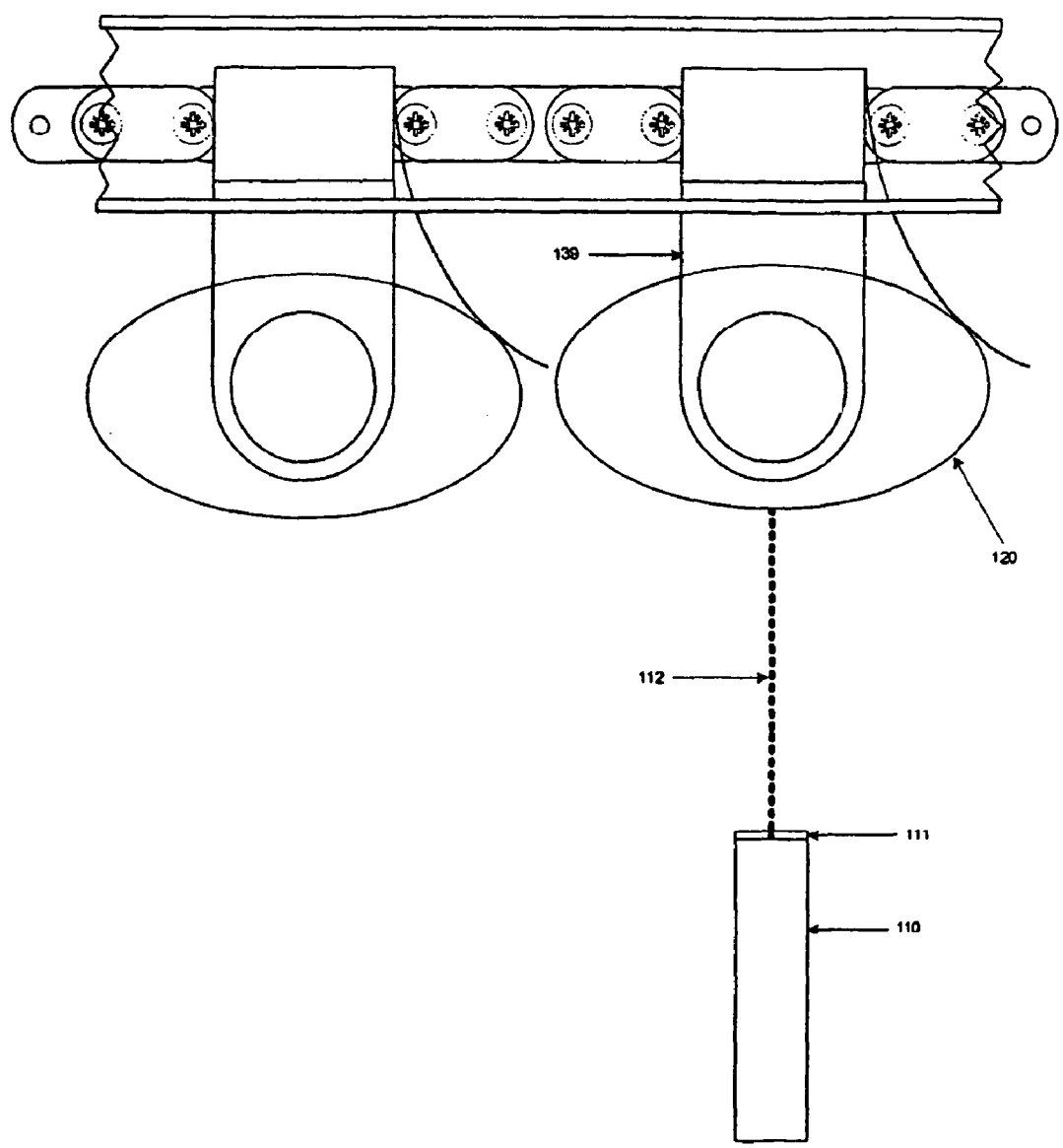
FIG. 6 is a diagrammatic view depicting apparatus embodying a portion of the present invention shown together with a portion of an egg-handling machine, for performing an embodiment of the method of the present invention.

In a method according to an embodiment of the present invention, an egg moves through a portion of an egg-grading machine as shown in FIG. 6. An egg-grading machine grades the quality of the eggs, and may also transport the eggs towards a packaging machine. Egg-grading machines will move the egg along a path. Somewhere along the path, and preferably immediately before the eggs are packed, a predetermined region can be selected where the egg will pass through and radiant energy can form markings on the egg. Typically, as shown in FIG. 6, egg-grading machines have calipers 139 that hold the eggs at some point in the path of the egg-grading machine. The radiant energy source 110 may be placed in proximity to this point when the eggs are held so that the radiant energy 112 forms the markings on an egg 120 as it passes through this predetermined region. This eliminates any need for a special apparatus to position the egg. In this way the method is performed inline with the egg-grading machine. A beam-sweeping unit 111 may control the direction of the radiant energy 112.

Figure 7:
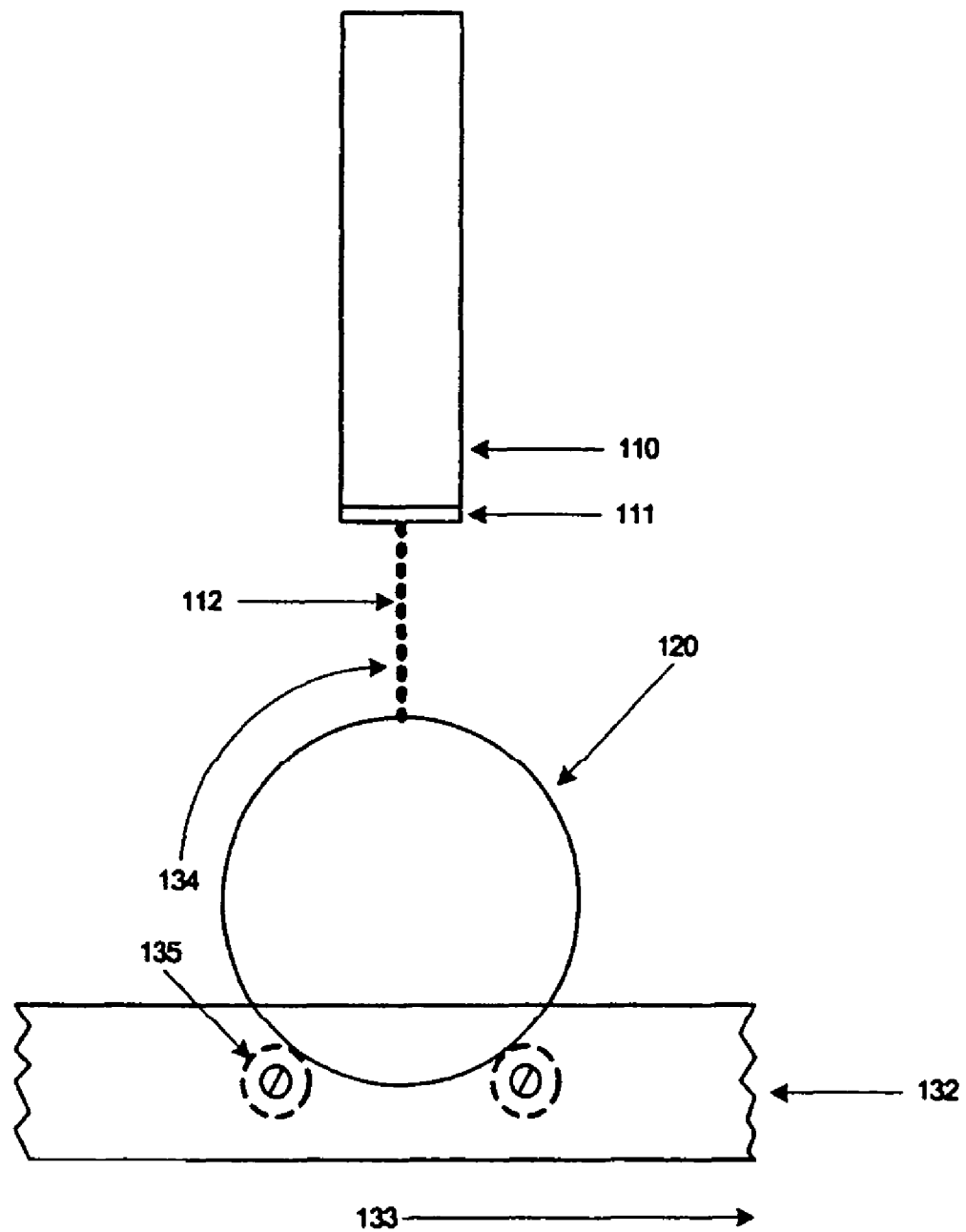
FIG. 7 is a diagrammatic view depicting apparatus useful in performing another embodiment of the method of the present invention.

In another embodiment of the present invention, a radiant energy source may be placed in proximity of an existing egg-handling machine. Egg-handling machines includes any device or apparatus that will control the movement of an egg along a path, including egg-grading machines. The radiant energy source can be placed in proximity to the egg-handling machine so that the markings may be applied to the egg inline. In FIG. 7, the egg-handling machine moves an egg 120 along a conveyor apparatus 132. Conveyor apparatus 132 may include rollers 135, or some other form of conveyance such as the calipers discussion above, that moves egg 120 in a particular direction 133. Egg 120 will move along apparatus 132 in the direction 133 apparatus 132 is moving, and egg 120 may move in a rotational direction 134 on apparatus 132. Radiant energy source 110 is placed in proximity to conveyor belt 132 such that radiant energy 112 is directed towards egg 120. Beam-sweeping unit 111 can be used to compensate for the movement 133 of conveyor belt 132 and the rotation 134 of egg 120, so that the text and graphics can be applied to the egg 120.

Figure 8:
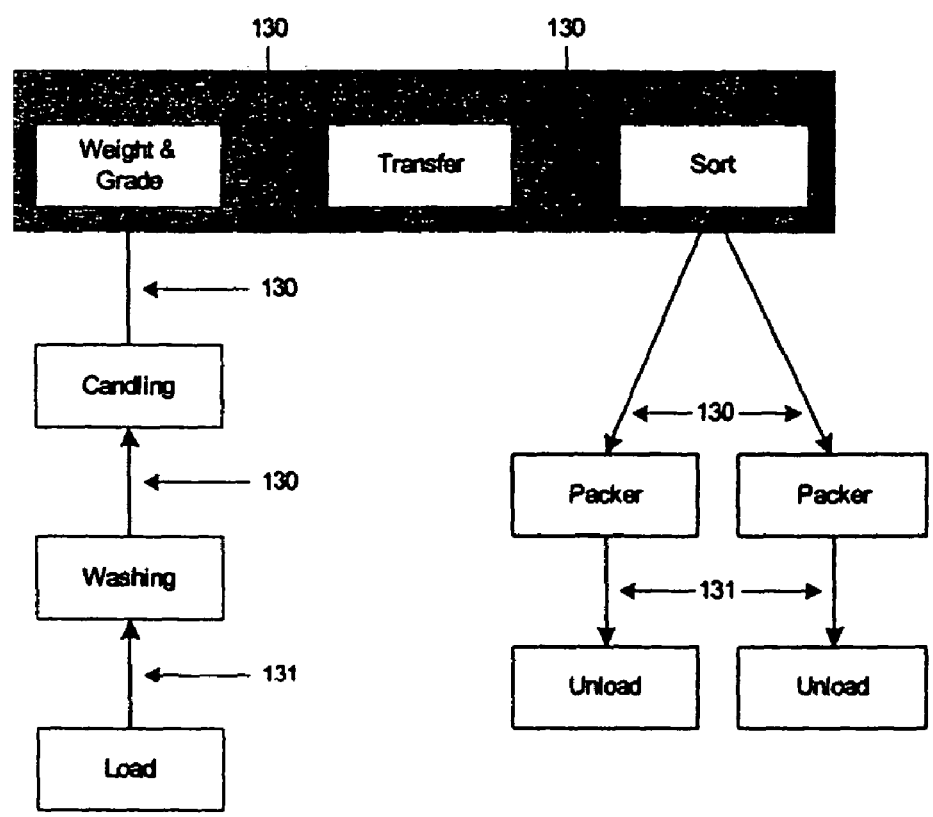
FIG. 8 is a block diagram depicting portions of an egg-handling machine and particularly illustrating inline and offline operations.

There are many variations of egg-handling machines. Most perform some common minimal basic functions. FIG. 8 is a block diagram outlining the basic functions of those machines. The eggs move through these machines while these basic functions are performed, and a radiant energy source can be placed inline 130 or offline 131 in between many of these functions to perform a method of the present invention. The eggs are loaded into the machine. An offline procedure may be performed after this function. The eggs are then washed, after which an inline method may be performed. The eggs are candled, after which an inline method may be performed. The eggs move to the grading portion of the machine where they are weighted and graded, after which an inline method may be performed. The eggs are then transferred to a sorter, before which an inline method may be performed. The eggs are then sorted by grades, after which an inline method may be performed. The eggs are placed into a package, after which an inline method may be performed. An offline process 131 can be performed prior to the load processor after the unload process and, typically involves human intervention or some other form of mechanical intervention alien to the egg-handling machine. In preferred embodiments of the present invention, the radiant energy source can be associated with an existing egg-handling machine without appreciably modifying the machine.

The radiant energy source may be connected to an input that can control the text and graphics. In one embodiment of the invention, the input is a computer. The computer can be used to enter the design of the advertisement, consisting of a tag line, a logo, and the freshness date, to be applied to the egg. The design of the tag line, logo, and freshness date can be entered into the computer in many ways, including scanning an image into the computer, or using software to make the design. The computer may be connected to the computer control system of the egg-handling machine and can import much of the data that is contained in the table of FIG. 11, and can calculate the key egg dates from the process date imported from the egg-handling machine. This data is then stored in the database together with the traceability code that can be generated by conventional indexing software located on the computer or elsewhere. The computer then controls the radiant energy source or the beam-sweeping unit to apply the marking to the egg.

Figure 9:
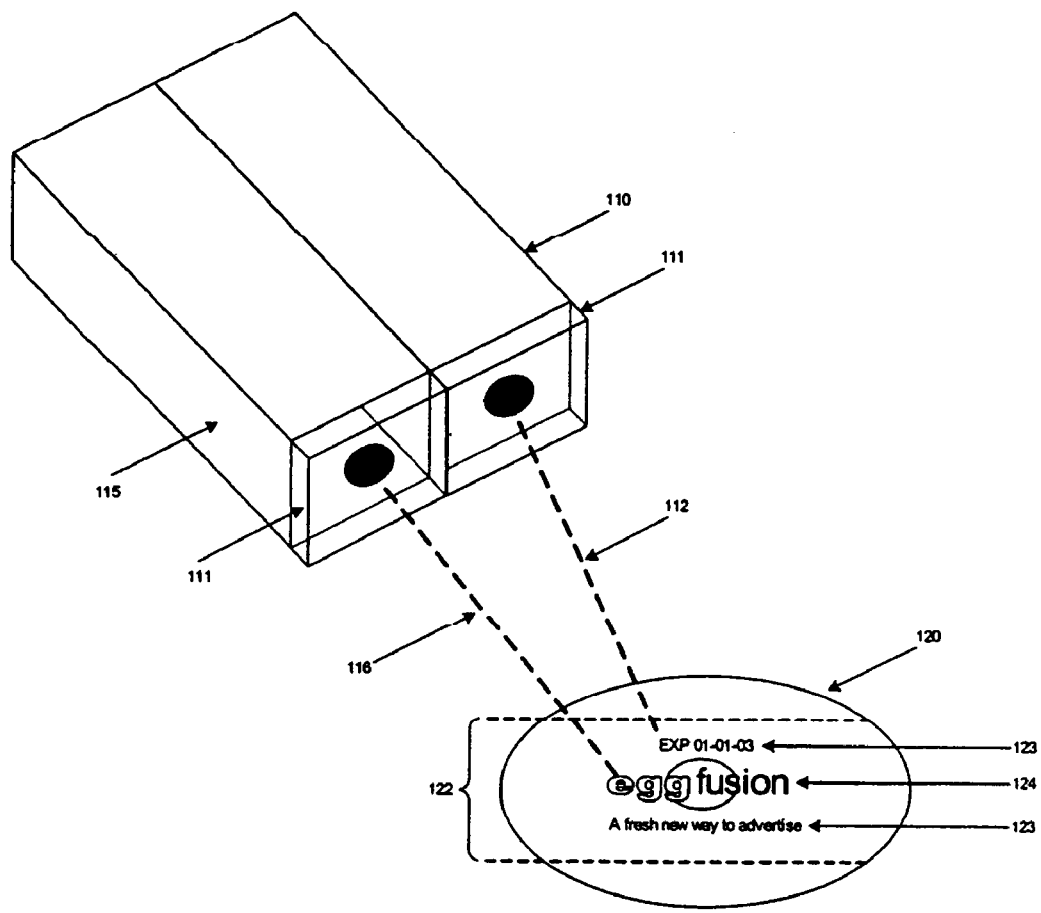
FIG. 9 is a diagrammatic view depicting apparatus for performing another embodiment of a method of the present invention.

In FIG. 9, a method is shown where the markings are formed by a raster pattern. A radiant energy source 110 can apply radiant energy 112 such that one ray of the radiant energy is responsible for marking along one horizontal of the egg to form text 123, and another radiant energy source 115 provides radiant energy 116 that is responsible for the marking of graphics 124. This also can be done with one radiant energy source that emits multiple rays of radiant energy, or with any plurality of radiant energy sources that emit radiant energy. Because of the high speed of many egg-handling machines, and therefore the small window of time during which the marking must occur, several sources may be required to provide all of the markings without decreasing the operating speed of the egg-handling machines.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A system for processing eggs and providing information relating to eggs that are processed by the system, the system comprising:
   at least one processing station configured to perform a processing of an egg and to transmit information comprising one or more operating conditions of the at least one processing station during the processing of the egg;
   a marking station for applying radiant energy to a shell of the egg to cause localized discoloration of the shell, the localized discoloration forming a marking comprising a human-readable manifestation of a traceability code; and
   a first central processing unit configured to provide to a data store and store therein historical information regarding the egg in association with the traceability code, the historical information obtained, at least in part, from at least one of the one or more operating conditions of the at least one processing station during the processing of the egg transmitted by the at least one processing station,
   at least some of the historical information in the data store being accessible through a web site by providing the traceability code.

2. The system of claim 1, wherein the marking further comprises a freshness date.

3. The system of claim 1, wherein the historical information regarding the egg comprises an identification of a producer of the egg.

4. The system of claim 1, wherein the historical information regarding the egg comprises information regarding a facility at which the egg was produced.

5. The system of claim 1, wherein the historical information regarding the egg comprises a location at which the egg was processed.

6. The system of claim 1, wherein the historical information regarding the egg comprises a date on which the egg was processed.

7. The system of claim 1, wherein the historical information regarding the egg comprises an identification of the at least one processing station.

8. The system of claim 1, wherein the processing station is a washing station, a candling station, or a grading station.

9. The system of claim 1, wherein the operating condition of the at least one processing station comprises a temperature under which the egg was washed.

10. The system of claim 1, wherein the radiant energy is applied by one or more laser beams emitted from a laser device as the egg moves through a proximity of the laser device.

11. The system of claim 10, wherein each of the one or more laser beams has a radiant power between 25 watts and 200 watts.

12. The system of claim 10, wherein the shell of the egg is affected by the one or more laser beams to a depth between 50 micrometers and 90 micrometers.

13. The system of claim 10, wherein the laser device comprises a beam movement unit to cause motions of the one or more laser beams relative to the egg as the egg moves through the proximity of the laser device, and wherein the motions are coordinated to produce the marking comprising the human-readable manifestation of the traceability code.

14. A method for processing eggs and providing information relating to eggs that are processed, comprising:
   washing an egg at a processing station;
   measuring a temperature under which the egg is washed at the processing station;
   marking the egg by applying radiant energy to a shell of the egg to cause discoloration of the shell, the discoloration forming a marking comprising a human-readable manifestation of a traceability code; and
   providing to a data store historical information regarding the egg in association with the traceability code, the historical information comprising the temperature under which the egg was washed at the processing station,
   wherein at least some of the historical information comprising the temperature under which the egg was washed at the processing station is accessible through a web site by providing the traceability code.

15. A method for collecting and providing information relating to an egg, comprising:
   obtaining historical information regarding the egg and a traceability code associated with the egg, wherein the historical information comprises one or more measurements of environmental conditions at a processing station during processing of the egg, and wherein a manifestation of the traceability code is formed on a shell of the egg by one or more laser beams;
   storing the historical information regarding the egg in a database in association with the traceability code;
   retrieving the historical information regarding the egg from the database upon a request that comprises the traceability code; and
   providing the historical information regarding the egg to an entity that issues the request.

16. The method of claim 15, wherein the historical information regarding the egg comprises a temperature under which the egg was washed at the processing station.

17. The method of claim 15, wherein the entity is a web site associated with a retailer that sells the egg.

18. A method for retrieving and providing information relating to an egg, comprising:
   providing a web site configured to receive a traceability code associated with the egg, wherein a manifestation of the traceability code is formed on a shell of the egg by one or more laser beams;
   using the traceability code to retrieve historical information regarding the egg from a database, the historical information comprising one or more operating parameters of the at least one processing station during processing of the egg; and
   displaying, through the web site, the historical information regarding the egg.

19. The method of claim 18, wherein the historical information regarding the egg comprises a temperature under which the egg was washed at the at least one processing station.

20. The method of claim 18, wherein the web site is provided by a retailer that sells the egg.

* * * * *